United States Patent
Hausler et al.

(10) Patent No.: US 10,699,183 B2
(45) Date of Patent: Jun. 30, 2020

(54) AUTOMATED SYSTEM FOR PROPOSING HELP CENTER ARTICLES TO BE WRITTEN TO FACILITATE RESOLVING CUSTOMER-SERVICE REQUESTS

(71) Applicant: Zendesk, Inc., San Francisco, CA (US)

(72) Inventors: Christopher J. Hausler, Coburg (AU); Michael G. Mortimer, Croydon Hills (AU); Soon-Ee Cheah, Bentleigh East (AU); Shi Yu Zhu, South Bank (AU); Ai-Lien Tran-Cong, East Melbourne (AU); Wai Chee Yau, Caulfield (AU); Hing Yip Pak, Brunswick (AU); Anh Thien Dinh, Pascoe Vale (AU)

(73) Assignee: Zendesk, Inc., San Francisco, CA (US)

( * ) Notice: Subject to any disclaimer, the term of this patent is extended or adjusted under 35 U.S.C. 154(b) by 319 days.

(21) Appl. No.: 15/912,181

(22) Filed: Mar. 5, 2018

(65) Prior Publication Data
US 2018/0197072 A1 Jul. 12, 2018

Related U.S. Application Data

(63) Continuation-in-part of application No. 15/607,318, filed on May 26, 2017, now Pat. No. 10,580,012.
(Continued)

(51) Int. Cl.
*G06Q 30/00* (2012.01)
*G06Q 10/10* (2012.01)
(Continued)

(52) U.S. Cl.
CPC .......... *G06N 3/0427* (2013.01); *G06F 16/35* (2019.01); *G06F 16/93* (2019.01); *G06F 40/279* (2020.01); *G06N 3/0445* (2013.01); *G06N 3/0454* (2013.01); *G06N 3/084* (2013.01); *G06Q 10/10* (2013.01); *G06Q 30/016* (2013.01);
(Continued)

(58) Field of Classification Search
CPC .................................................. G06Q 30/016
See application file for complete search history.

(56) References Cited

U.S. PATENT DOCUMENTS

2005/0234879 A1* 10/2005 Zeng ..................... G06F 16/951
2005/0234953 A1* 10/2005 Zhang ................. G06F 16/3346
(Continued)

*Primary Examiner* — Maria C Santos-Diaz
(74) *Attorney, Agent, or Firm* — Park, Vaughan, Fleming & Dowler LLP

(57) ABSTRACT

The system obtains a set of tickets representing customer requests generated by a customer-support ticketing system. Next, the system feeds words from each ticket through a model to generate a request vector for the ticket, wherein the request vector comprises numerical values representing words in the ticket. The system then embeds the request vectors in a vector space. If help center articles already exist, the system embeds article vectors for the existing help center articles in the vector space. Next, the system identifies clusters of request vectors, which are within a pre-specified distance of each other in the vector space. If an identified cluster is more than a pre-specified distance away from a closest article vector in the vector space, the system notifies a content creator that a new article needs to be written, or an existing article needs to be updated, to cover the identified cluster.

30 Claims, 8 Drawing Sheets

Related U.S. Application Data which is a continuation-in-part of application No. 15/087,755, filed on Mar. 31, 2016.

(51) Int. Cl.
*G06N 3/04* (2006.01)
*G06N 3/08* (2006.01)
*G06F 16/35* (2019.01)
*G06F 16/93* (2019.01)
*G06F 40/279* (2020.01)
*G06F 40/30* (2020.01)
*G06Q 10/02* (2012.01)

(52) U.S. Cl.
CPC ............... *G06F 40/30* (2020.01); *G06N 3/08* (2013.01); *G06Q 10/02* (2013.01)

(56) References Cited

U.S. PATENT DOCUMENTS

| | | | |
|---|---|---|---|
| 2015/0220833 A1* | 8/2015 | Le | G06N 3/084 706/16 |
| 2016/0012609 A1* | 1/2016 | Laska | G06K 9/6267 382/103 |
| 2016/0057499 A1* | 2/2016 | Foerster | H04N 21/251 705/319 |
| 2016/0328388 A1* | 11/2016 | Cao | G10L 15/18 |
| 2017/0032273 A1* | 2/2017 | Ho | G06N 5/04 |
| 2017/0060366 A1* | 3/2017 | Alexander | G06F 11/3089 |
| 2017/0161279 A1* | 6/2017 | Franceschini | G06F 16/93 |
| 2017/0161619 A1* | 6/2017 | Franceschini | G06N 5/022 |
| 2017/0169475 A1* | 6/2017 | Korpusik | G06Q 50/01 |
| 2018/0096060 A1* | 4/2018 | Peled | G06F 16/35 |

* cited by examiner

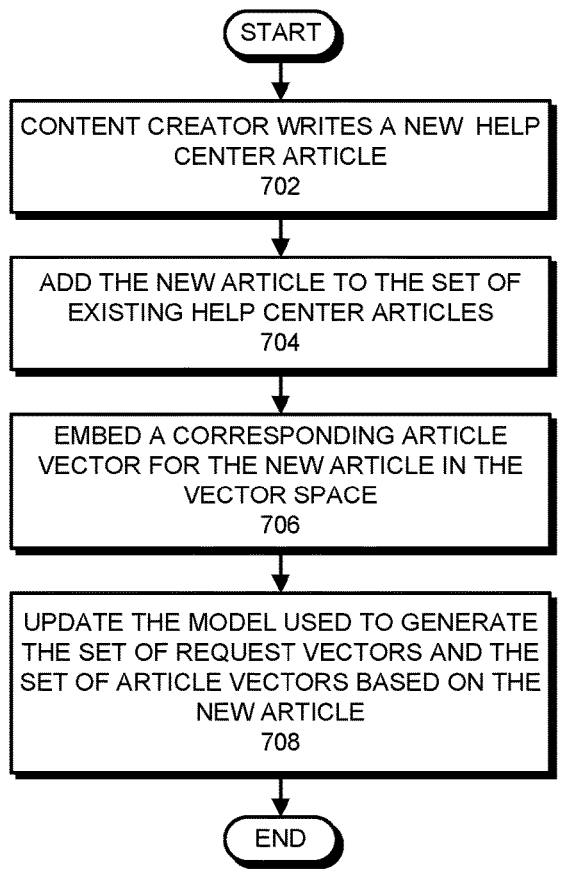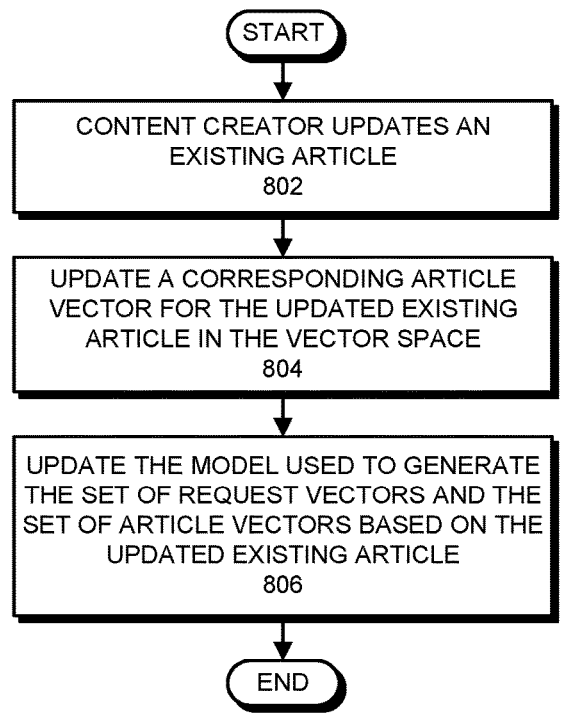
FIG. 7
FIG. 8

AUTOMATED SYSTEM FOR PROPOSING HELP CENTER ARTICLES TO BE WRITTEN TO FACILITATE RESOLVING CUSTOMER-SERVICE REQUESTS

RELATED APPLICATIONS

This application is a continuation-in-part of, and hereby claims priority under 35 U.S.C. § 120 to, pending U.S. patent application Ser. No. 15/607,318, entitled "Article-Suggestion System for Automatically Resolving Customer-Service Requests," by inventors Christopher J. Hausler, et al., filed on 26 May 2017. U.S. patent application Ser. No. 15/607,318 is itself a continuation-in-part of, and claims priority under 35 U.S.C. § 120 to, pending U.S. patent application Ser. No. 15/087,755, entitled "Answer Suggestion System for Automatically Resolving Customer Requests," by inventor Thomas Pelletier, filed on 31 Mar. 2016.

BACKGROUND

Field

The disclosed embodiments generally relate to computer-based applications that help businesses manage customer-service interactions. More specifically, the disclosed embodiments relate to an automated system for proposing help center articles to be written to facilitate resolving customer-service requests.

Related Art

As electronic commerce continues to proliferate, customers are beginning to use online customer-service resources to solve problems, or to obtain information related to various products or services. These online customer-service resources commonly include ticketing systems, product-related knowledge bases, and online chat systems that are designed to help customers resolve their problems, either by providing information to the customers, or by facilitating online interactions with customer-support agents.

When designed properly, these online customer-service resources can automate customer-service interactions, thereby significantly reducing a company's customer-service costs. Research has shown that customers can be satisfied with self-service solutions to their problems, for example by receiving articles containing information that can be used to resolve their problem, especially if the request can be resolved in minutes, as opposed to hours or days if the request is answered by a human customer-support agent.

One challenge in building such systems, which provide helpful articles, is to determine which articles need to be written to resolve ongoing customer-service issues. This is especially challenging in new customer-service systems for which no help center articles have been written yet. Even if a number of help center articles have already been written, there often exist commonly occurring issues or new issues, which are not adequately addressed by the existing help center articles.

Hence, what is needed is a system that automatically proposes help center articles to be written to facilitate resolving subsequent customer-service requests.

SUMMARY

The disclosed embodiments relate to a system that automatically suggests articles to be written to help resolve customer requests in a customer-support ticketing system. During operation, the system obtains a set of tickets representing customer requests generated by the customer-support ticketing system, wherein each customer request relates to a product or a service used by a customer. Next, the system produces a set of request vectors for the set of tickets by feeding words from each ticket through a model to generate a request vector for the ticket, wherein the request vector comprises numerical values representing words in the ticket. The system then embeds the set of request vectors in a vector space. If a set of existing help center articles have already been written, the system embeds a set of article vectors for the set of existing help center articles in the vector space. Next, the system performs a clustering operation on the set of request vectors to identify clusters of request vectors, which are within a pre-specified distance of each other in the vector space. Finally, if an identified cluster of request vectors is more than a pre-specified distance away from a closest article vector in the vector space, the system notifies a content creator that a new article needs to be written or an existing article needs to be updated to cover the identified cluster.

In some embodiments, when the content creator writes a new article for the help center, the system: adds the new article to the set of existing help center articles; embeds a corresponding article vector for the new article in the vector space; and updates the model used to generate the set of request vectors and the set of article vectors based on the new article.

In some embodiments, when the content creator updates an existing article in the set of existing articles, the system: updates a corresponding article vector for the updated existing article in the vector space; and updates the model used to generate the set of request vectors and the set of article vectors based on the updated existing article.

In some embodiments, notifying the content creator involves presenting the content creator with one or more of the following: a cluster priority score, which indicates an importance of the cluster; a number of request vectors in the cluster; a set of keywords from tickets associated with the cluster; a suggested title for the cluster; a set of exemplary tickets associated with the cluster; one or more age metrics for tickets associated with the cluster; a set of articles having corresponding article vectors that are closest to a center of the cluster; and a set of prototypical customer service agent responses for tickets in the cluster.

In some embodiments, the priority score for a cluster is determined based on a number of tickets associated with the cluster and how recently tickets were received for the cluster.

In some embodiments, the clustering operation is an online clustering operation, which incrementally adds a new request vector to the vector space when a new ticket is received, and incrementally updates the existing clusters to accommodate the new request vector.

In some embodiments, the online clustering operation includes a decay mechanism that kills a cluster if a ticket has not been received for the cluster within a predefined number of preceding tickets.

In some embodiments, the system notifies the content creator that an existing article needs to be deleted if a corresponding article vector for the existing article is within a pre-specified distance of another article vector for another existing article in the vector space.

In some embodiments, generating a request vector for a ticket involves: obtaining a set of words from the ticket; generating a word vector for each word in the set of words, thereby producing a set of word vectors; feeding the set of word vectors through a recurrent neural network to produce a preliminary request vector representing the ticket; and feeding the preliminary request vector through a feed-forward neural network to produce the request vector.

In some embodiments, obtaining the set of words from the ticket involves: combining a subject field and a description field from the ticket into a blob of text; feeding the blob of text through a regex processor to remove text that does not comprise words to produce a refined blob of text; and selecting the set of words from the refined blob of text.

In some embodiments, generating the word vector for each word in the set of words involves using the Word2vec technique to generate the word vector for each word.

In some embodiments, the recurrent neural network comprises a long short-term memory (LSTM) network.

In some embodiments, the feed-forward neural network modifies the preliminary request vector in a manner that moves request vectors and article vectors for responsive articles closer together.

In some embodiments, each customer request includes a question from a customer about a product or a service used by the customer.

BRIEF DESCRIPTION OF THE FIGURES

FIG. 7 presents a flow chart illustrating what happens after a content creator writes a new article in accordance with the disclosed embodiments.

FIG. 8 presents a flow chart illustrating what happens after a content creator updates an existing article in accordance with the disclosed embodiments.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Computing Environment

Figure 1:
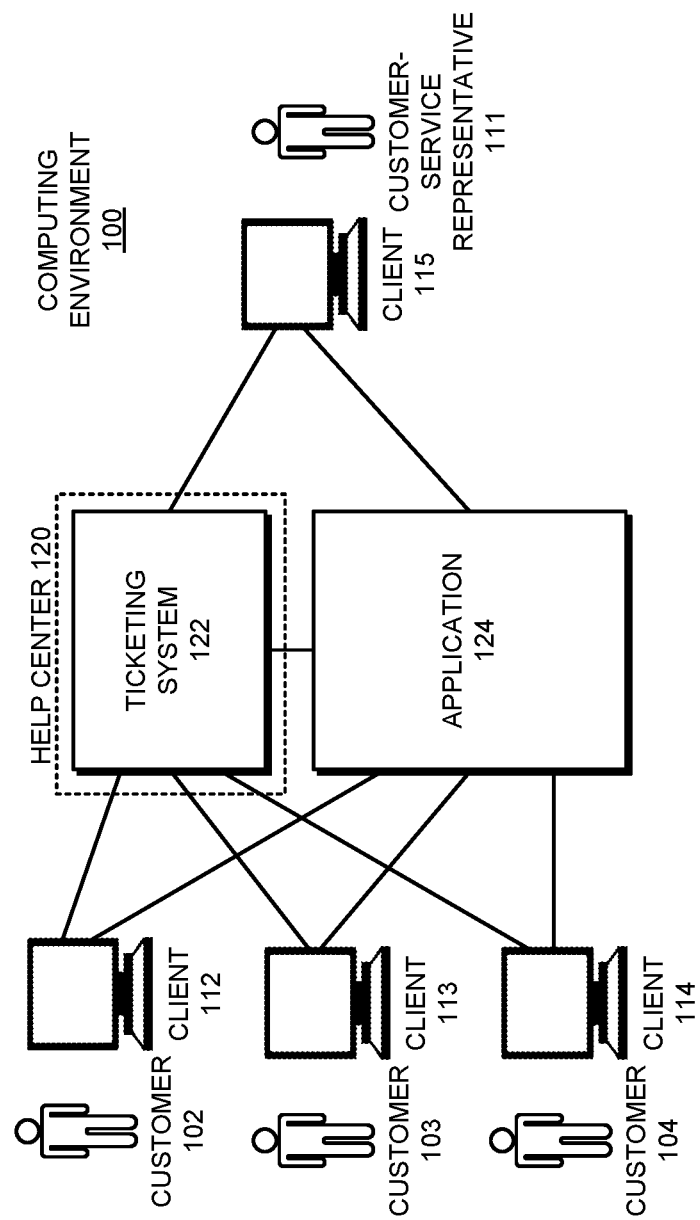
FIG. 1 illustrates a computing environment including an application and associated ticketing system in accordance with the disclosed embodiments.

FIG. 1 illustrates a computing environment 100 including an application 124 and ticketing system 122 in accordance with the disclosed embodiments. Within computing environment 100, a number of customers 102-104 interact with application 124 through client computer systems 112-114, respectively. Application 124 is provided by an organization, such as a commercial enterprise, to enable customers 102-104 to perform various operations associated with the organization, or to access one or more services provided by the organization. For example, application 124 can include online accounting software that customers 102-104 can access to prepare and file tax returns online. In another example, application 124 provides a commercial website for selling sporting equipment. Note that application 124 can be hosted on a local or remote server.

If customers 102-104 have problems or questions about application 124, they can access a help center 120 to obtain help in dealing with issues, which can include various problems and questions. For example, a user of accounting software may need help in using a feature of the accounting software, or a customer of a website that sells sporting equipment may need help in cancelling an order that was erroneously entered. This help may be provided by a customer-service representative 111 who operates a client computer system 115 and interacts with customers 102-104 through help center 120. This help may also comprise automatically suggested helpful articles that the customer can read to hopefully resolve the problem or question. Note that customer-service representative 111 can access application 124 (either directly or indirectly through help center 120) to help resolve an issue.

In some embodiments, help center 120 is not associated with computer-based application 124, but is instead associated with another type of product or service that is offered to a customer. For example, help center 120 can provide assistance with a product, such as a television, or with a service such as a package-delivery service.

Help center 120 organizes customer issues using a ticketing system 122, which generates tickets to represent each customer issue. Ticketing systems are typically associated with a physical or virtual "help center" (or "help desk") for resolving customer problems. Note that, although the present invention is described with reference to a ticketing system, it is not meant to be limited to customer-service interactions involving ticketing systems. In general, the invention can be applied to any type of system that enables a customer to resolve a problem with a product or service provided by an organization.

Ticketing system 122 comprises a set of software resources that enable a customer to resolve an issue. In the illustrated embodiment, specific customer issues are associated with abstractions called "tickets," which encapsulate various data and metadata associated with the customer requests to resolve an issue. (Within this specification, tickets are more generally referred to as "customer requests.") An exemplary ticket can include a ticket identifier, and information (or links to information) associated with the problem. For example, this information can include: (1) information about the problem; (2) customer information for one or more customers who are affected by the problem; (3) agent information for one or more customer-service agents who are interacting with the customer; (4) email and other electronic communications about the problem (which, for example, can include a question posed by a customer about the problem); (5) information about telephone calls associated with the problem; (6) timeline information associated with customer-service interactions to resolve the problem, including response times and resolution times, such as a first reply time, a time to full resolution and a requester wait time; and (7) effort metrics, such as a number of communications or responses by a customer, a number of times a ticket has been reopened, and a number of times the ticket has been reassigned to a different customer-service agent.

Article-Suggestion System

Figure 2:
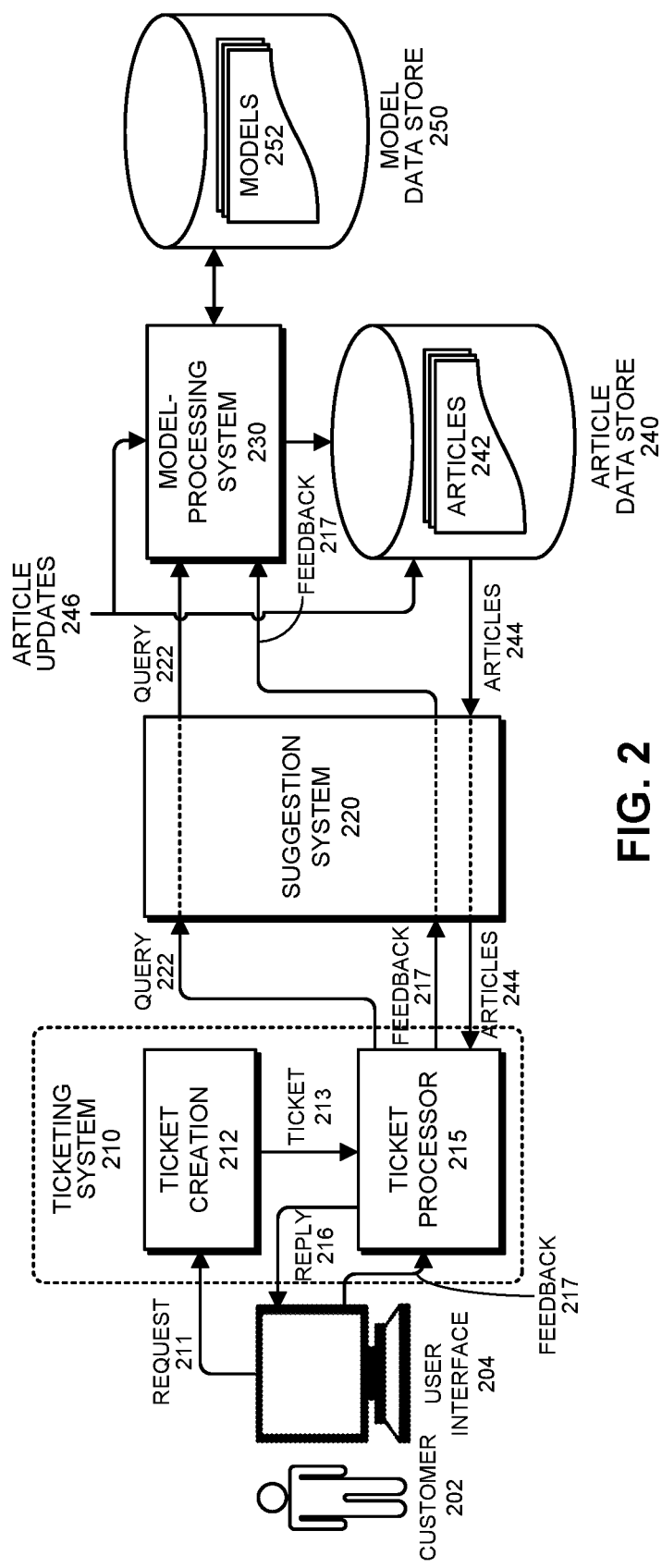
FIG. 2 illustrates system components involved in the article-suggestion process in accordance with the disclosed embodiments.

FIG. 2 illustrates various system components involved in the article-suggestion process in accordance with the disclosed embodiments. The process starts with a ticket-creation operation 212 that takes place within ticketing system 210. This ticket-creation operation is triggered by actions of a customer 202 who has an issue with a product or a service, and submits a request 211 to obtain help with the issue. Note that customer 202 can submit request 211 through a number of possible channels, including through email, online forms, social networking sites, etc. In response to request 211, the ticket-creation operation 212 produces a ticket 213 that feeds into a ticket processor 215.

Next, ticket processor 215 sends a query 222, which is associated with the customer request 211 and the corresponding ticket 213, to a suggestion system 220. Then suggestion system 220 forwards query 222 to a model-processing system 230, to obtain a set of suggested articles. In response to query 222, model-processing system 230 uses various machine-learning techniques based on models 252 contained in a model data store 250 to identify a set of helpful articles 242 from a set of help center articles contained in an article data store 240. The identified helpful articles 244 are then returned to suggestion system 220. Next, suggestion system 220 returns the articles 244 to ticket processor 215, which sends a reply 216 containing the suggested articles 244 to a user interface 204 to be displayed to customer 202. Note that user interface 204 can be implemented in a number of different ways for both mobile and desktop platforms. For example, user interface 204 can be incorporated into: a web page, an email, or a UI screen provided by an application.

Next, customer 202 can provide feedback 217 about the suggested articles 244 indicating whether the suggested articles 244 were helpful or not, and this feedback 217 is propagated back through ticket processor 215 to model-processing system 230, wherein the feedback 217 can be used to update models 252 to make better predictions about which articles are most helpful for resolving a specific issue.

Article-Suggestion Process

Figure 3:
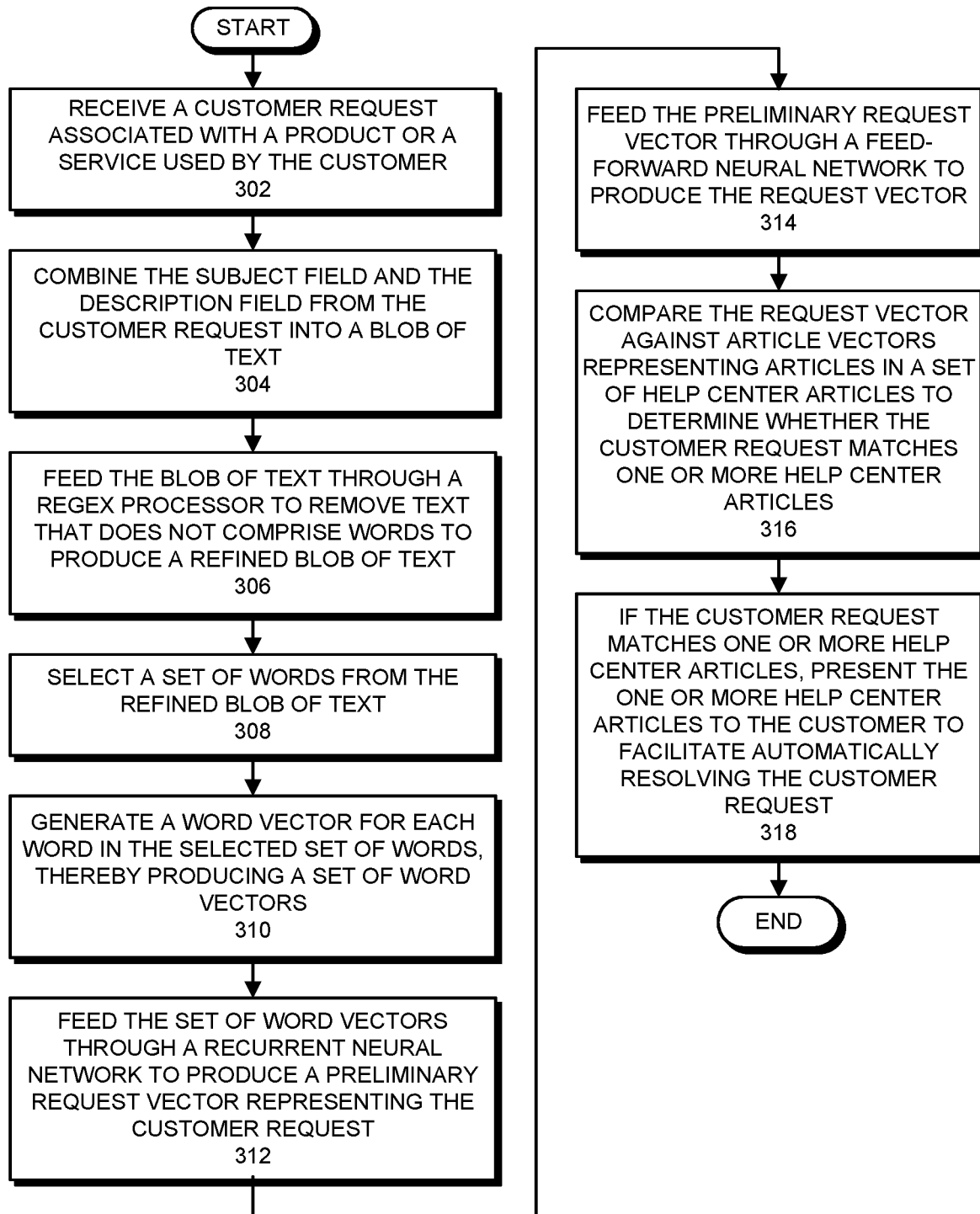
FIG. 3 presents a flow chart illustrating the article-suggestion process in accordance with the disclosed embodiments.

FIG. 3 presents a flow chart illustrating the article-suggestion process in accordance with the disclosed embodiments. Note that this process is performed by model-processing system 230, which receives a query 222 that contains customer request 211 as is illustrated in FIG. 2. At the start of this process, the system receives the customer request 211, wherein the customer request 211 is associated with a product or a service used by the customer (step 302).

Next, the system selects a set of words from the customer request 211. During this word-selection process, the system combines a subject field and a description field from the customer request 211 into a blob of text (step 304). The system then feeds the blob of text through a regex processor to remove text that does not comprise words to produce a refined blob of text (step 306). More specifically, the regex processor strips out textual items the system does not care about, such as numbers or email addresses. Finally, the system selects the set of words from the refined blob of text (step 308). In an exemplary embodiment, the system selects 75 words from the refined blob of text to form the set of words.

The system then generates a "request vector" from the selected set of words. During this process, the system generates a word vector for each word in the selected set of words, thereby producing a set of word vectors (step 310). In an exemplary embodiment, the system uses the Word2vec model to produce each word vector. (See Mikolov, Tomas; et al. "Efficient Estimation of Word Representations in Vector Space". arXiv:1301.3781.) The system then feeds the set of word vectors through a recurrent neural network to produce a preliminary request vector representing the customer request (step 312). In an exemplary embodiment, the recurrent neural network comprises a long short-term memory (LSTM) network. In this embodiment, the system feeds the set of word vectors through the LSTM in both a forward direction and a backward direction and then averages the resulting representations to produce the preliminary request vector. At a conceptual level, the LSTM learns the context of a document by reading it one word at a time. Note that by processing the set of word vectors in both forward and backward directions, the system mitigates the LSTM's tendency to forget older words. Finally, the system feeds the preliminary request vector through a feed-forward neural network to produce the request vector (step 314). In an exemplary embodiment, the feed-forward neural network comprises a fully connected feed-forward neural network with one layer. Note that this feed-forward neural network has been trained to move request vectors and article vectors for responsive articles closer together.

Note that article vectors are produced in the same way as request vectors. For example, in an exemplary embodiment, 75 words are selected from the title and abstract of an article, and these 75 words are similarly processed using the Word2vec model, the LSTM network and the feed-forward neural network.

The system then compares the request vector against article vectors representing articles in a set of help center articles to determine whether the customer request matches one or more help center articles (step 316). In an exemplary embodiment, while comparing the request vector against the article vectors, the system calculates cosine distances between the request vector and the article vectors, and then uses the cosine distance to determine whether the customer request matches one or more help center articles. If no articles are close enough to matching the customer request based on a cosine distance threshold, the system does not return any articles.

If the customer request matches one or more help center articles, the system presents the one or more help center articles to the customer to facilitate automatically resolving the customer request (step 318).

Handling Customer Feedback

Figure 4A:
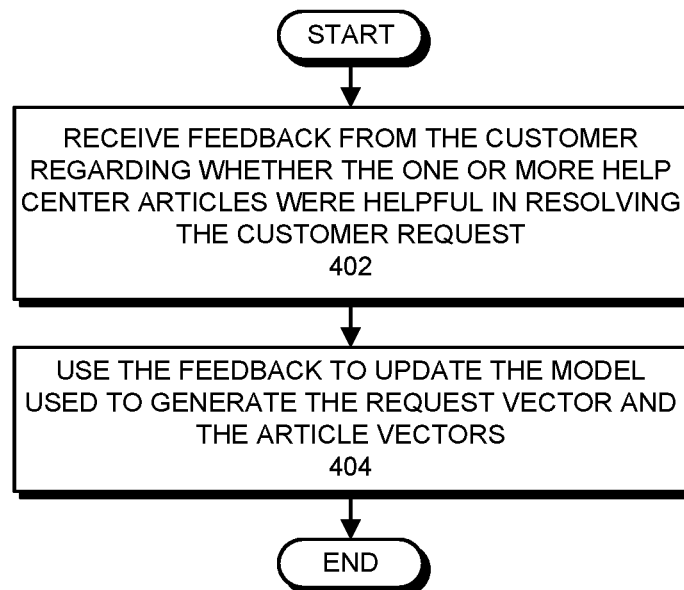
FIG. 4A presents a flow chart illustrating how customer feedback is processed in accordance with the disclosed embodiments.

FIG. 4A presents a flow chart illustrating how customer feedback can be processed in accordance with the disclosed embodiments. At the start of this process, the system receives feedback from the customer regarding whether the one or more help center articles were helpful in resolving the customer request (step 402). The system then uses this feedback to update the model used to generate the request vector and the article vectors (step 404).

Handling Article Updates

Figure 4B:
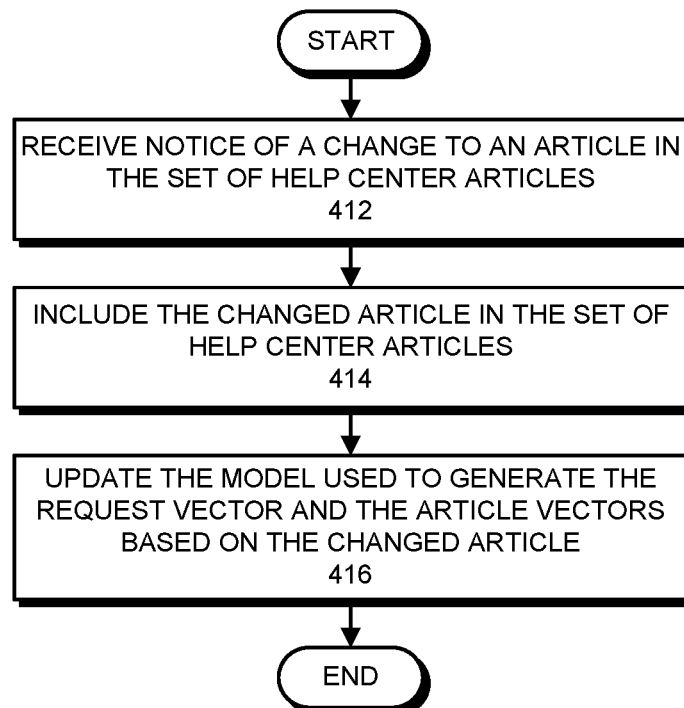
FIG. 4B presents a flow chart illustrating how article updates are processed in accordance with the disclosed embodiments.

FIG. 4B presents a flow chart illustrating how article updates are processed in accordance with the disclosed embodiments. The system first receives notice of a change to an article in the set of help center articles (step 412). In an exemplary embodiment, the system has a listener, which listens to help center updates and publishes any changes to articles or new articles. Next, the system includes the changed article in the set of help center articles, (step 414), and also updates the model used to generate the request vector and the article vectors based on the changed article (step 416).

Figure 4C:
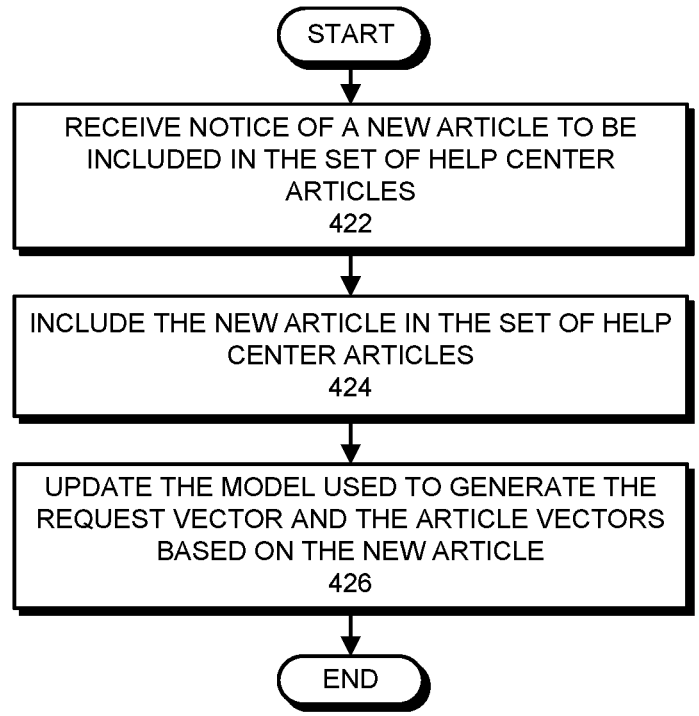
FIG. 4C presents a flow chart illustrating how new articles are processed in accordance with the disclosed embodiments.

FIG. 4C presents a flow chart illustrating how new articles are processed in accordance with the disclosed embodiments. First, the system receives notice of a new article to be included in the set of help center articles (step 422). Next, the system includes the new article in the set of help center articles (step 424), and also updates the model used to generate the request vector and the article vectors based on the new article (step 426).

Training Process

Figure 4D:
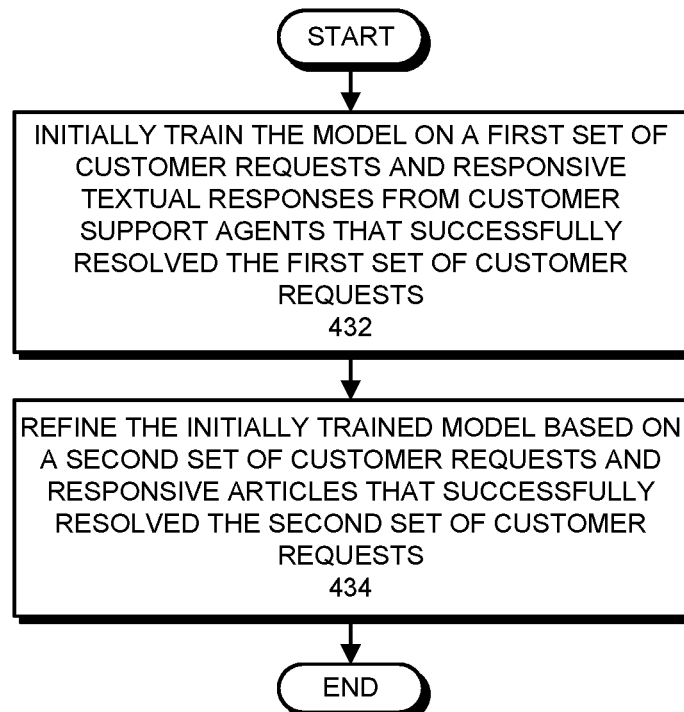
FIG. 4D presents a flow chart illustrating a training process for the system in accordance with the disclosed embodiments.

FIG. 4D presents a flow chart illustrating the training process for the article-suggestion system in accordance with the disclosed embodiments. Before receiving customer requests, the system trains the model used to generate the request vector and the article vectors. During this training process, the system initially trains the model on a first set of customer requests and responsive textual responses from customer support agents that successfully resolved the first set of customer requests (step 432). The system then refines the initially trained model based on a second set of customer requests and responsive articles that successfully resolved the second set of customer requests (step 434).

Note that instead of training the model solely based on pairs of tickets and responsive help center articles, we initially train the model based on tickets that have received textual responses from a customer support agent and have received good customer satisfaction ratings. In doing so, we try to learn a mapping between the support tickets and the agent's textual responses. We then use "transfer learning" to take this initially trained model and refine it using examples where an agent has actually used a help center article to resolve a ticket. The reason we do this is because we have a far larger corpus of data for cases where the customer support agent successfully resolved a ticket using textual responses than we do for cases wherein the customer support agent used a help center article to resolve a ticket. In this way, we can leverage all of the data related to resolving tickets, instead of relying on the smaller subset of cases involving help center articles.

Note that while training the recurrent neural network, the system can use the "dropout" technique to prevent overfitting by randomly dropping units (along with their connections) from the neural network during training. (See "Dropout: A Simple Way to Prevent Neural Networks from Overfitting," Nitish Journal of Machine Learning Research 15 (2014) 1929-1958, et al., Journal of Machine Learning Research 15 (2014) 1929-1958.)

Moreover, while training the feed-forward neural network, the system can update the feed-forward network by using a loss function and a gradient descent technique to update parameters in the feed-forward neural network so that tickets and responsive articles move closer together, and tickets and articles that do not solve the problem move farther apart.

System for Suggesting Articles to be Written

The disclosed embodiments also provide a system for suggesting articles to be written. This system can be used for a number of purposes. First, the system can be used to help clients who have not created a help center previously, and have not written any help center articles yet. If a new ticketing system operates for a few months, it is possible to determine from the tickets what types of conversations customer-service agents are having with customers. This information can be used to determine what types of articles to write. Second, the system can also be used to optimize an existing set of help center articles, either by suggesting new articles to write or suggesting modifications to existing articles to help in resolving typical customer requests. Finally, the system can also be used to detect and remove duplicate articles.

Figure 5:
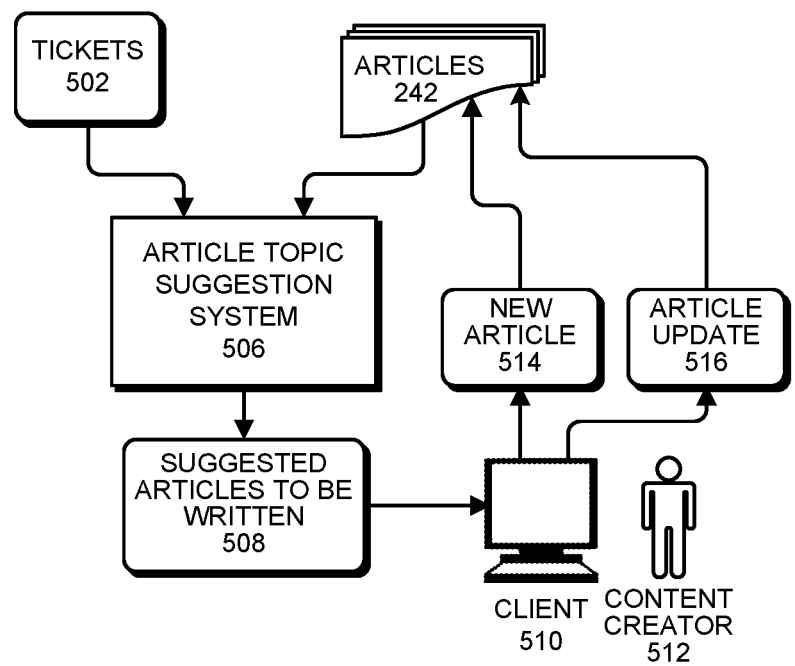
FIG. 5 illustrates a system for suggesting new articles to be written in accordance with the disclosed embodiments.

FIG. 5 illustrates an exemplary system that suggests articles to be written in accordance with the disclosed embodiments. During operation, the system obtains tickets 502 representing customer requests. The system also receives a set of existing articles 242, if articles have already been written for the system. Next, an article topic suggestion system 506 generates a set of suggested articles to be written 508 based on the tickets 502 and the existing articles 242. (This process is described in more detail below with reference to the flow chart in FIG. 6.) The suggested articles to be written 508 are then presented to a content creator 512 through a user interface (UI) on a client system 510. Content creator 512 then either writes a new article 514, or applies an article update 516 to an existing article in the set of existing articles 242.

Process of Suggesting Articles to be Written

Figure 6:
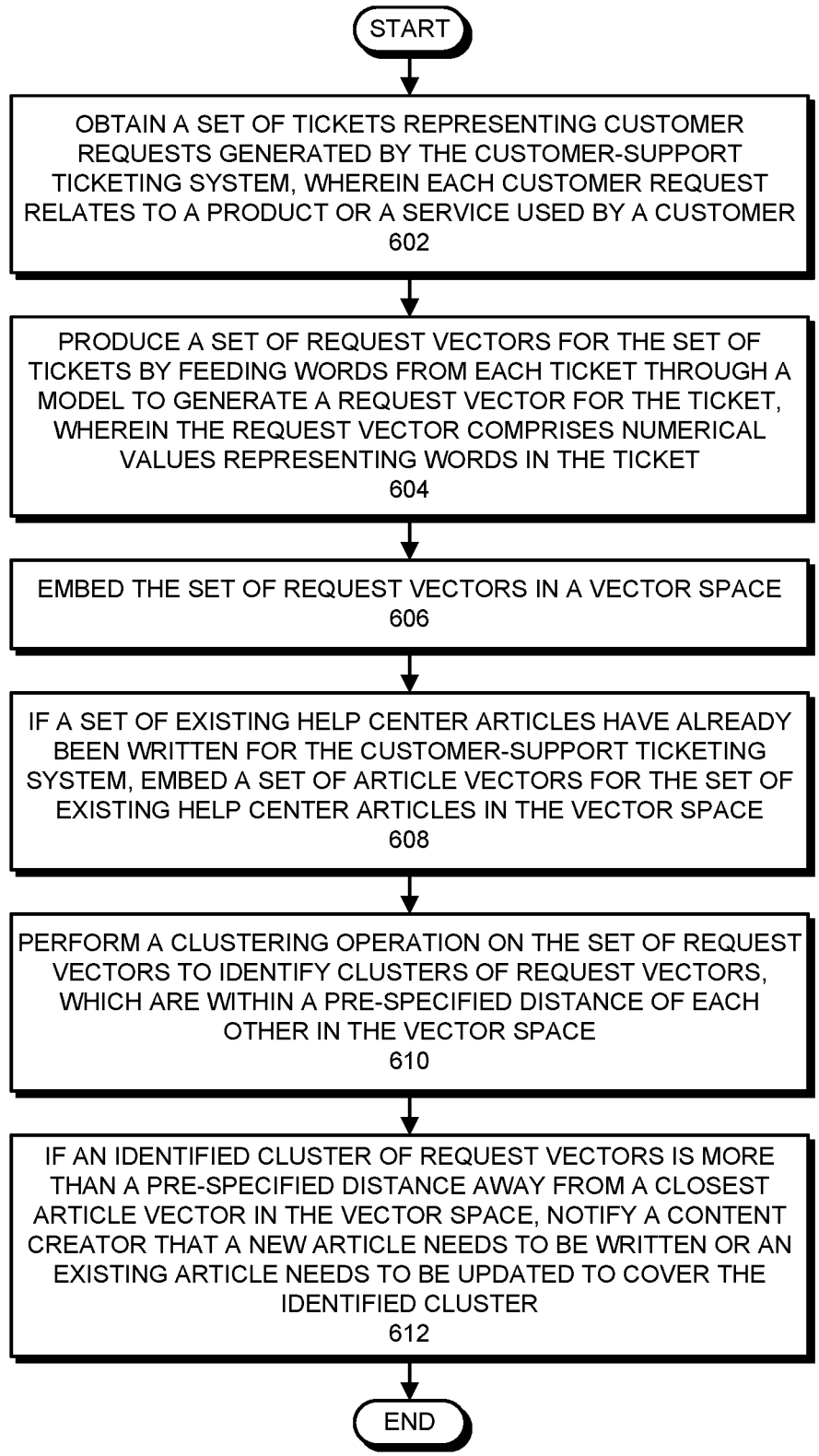
FIG. 6 presents a flow chart illustrating the process of suggesting new articles to be written in accordance with the disclosed embodiments.

FIG. 6 presents a flow chart illustrating the process of suggesting new articles to be written in accordance with the disclosed embodiments. At the start of this process, the system obtains a set of tickets representing customer requests generated by the customer-support ticketing system, wherein each customer request relates to a product or a service used by a customer (step 602). Next, the system produces a set of request vectors for the set of tickets by feeding words from each ticket through a model to generate a request vector for the ticket, wherein the request vector comprises numerical values representing words in the ticket (step 604). The system then embeds the set of request vectors in a vector space (step 606). If a set of existing help center articles have already been written, the system embeds a set of article vectors for the set of existing help center articles in the vector space (step 608). (Note that while generating a vector for an article, instead of extracting words solely from ticket fields, the system can extract words from the following ticket and article fields: ticket subject, ticket description, article title, and article body.)

Next, the system performs a clustering operation on the set of request vectors to identify clusters of request vectors, which are within a pre-specified distance of each other in the vector space (step 610). Note that instead of using a conventional offline k-means clustering operation, the disclosed embodiments can perform an "online" clustering operation, which incrementally adds a new request vector to the vector space when a new ticket is received, and incrementally updates the existing clusters to accommodate the new request vector. This can be accomplished by processing the tickets in creation order from oldest to newest. As each ticket is processed, the system computes a corresponding request vector for the ticket and embeds the request vector in the vector space. If the request vector is within a pre-specified distance of an existing cluster, the system adds the request vector to the existing cluster, and the system adjusts the centroid of the existing cluster to account for the new request vector. On the other hand, if the request vector is not within a pre-specified distance of an existing cluster, the system creates a new cluster for the request vector. The online clustering operation can also include a decay mechanism that kills a cluster if a ticket has not been received for the cluster within a pre-specified number of preceding tickets.

Finally, if an identified cluster of request vectors is more than a pre-specified distance away from a closest article vector in the vector space, the system notifies a content creator that a new article needs to be written, or an existing article needs to be updated, to cover the identified cluster (step 612). As mentioned above, this notification can include: a cluster priority score; a number of request vectors in the cluster; a set of keywords from tickets associated with the cluster; a suggested title for the cluster; a set of exemplary tickets associated with the cluster; one or more age metrics for tickets associated with the cluster (e.g., when the cluster was first detected, and when a ticket for the cluster was last received); a set of articles having corresponding article vectors that are closest to a center of the cluster (along with a closest article's distance from the cluster); and a set of prototypical customer service agent responses for tickets in the cluster.

The priority score for a cluster can be determined based on the number of tickets associated with the cluster, and how recently tickets were received for the cluster. In a new help center for which no articles have been written yet, the system might put more weight on the number of tickets associated with each cluster. In contrast, for a well-established help center with a large number of existing articles, the system may not care about clusters associated with large numbers of tickets because tickets for such clusters may not be able to benefit from self-service issue resolution based on articles.

To determine the keywords for a cluster, the system employs one of two approaches. In one of these approaches, the system trains a linear classifier to determine whether a request vector for a ticket is in the cluster. The system can then look into the linear classifier to determine which words are the most important for determining membership in the cluster. The system can then use these words as keywords. Alternatively, the system can use part-of-speech (PoS) extraction techniques to identify patterns of verbs and nouns associated with the keywords before prioritizing these candidate keywords based on their intra- and inter-cluster occurrences.

To determine a title for a cluster, the system can use PoS and dependency parsing techniques to look for specific types of phrases (wherein a verb acts on a noun) in tickets associated with the cluster. These phrases can then be fed through the model to produce corresponding vectors in the vector space. The phrases for the vectors that fall closest to the center of the cluster are extracted. The number of times words occur in a sequence as observed in the set of phrases is stored in a graph structure. Finally, the sequence of words forming the cluster title is constructed by traversing the graph to identify the high probability (i.e., most visited) regions, which subsequently form the title of the cluster.

To identify the prototypical customer service agent responses, the system can feed customer service agent responses for tickets associated with the cluster through the model to generate corresponding response vectors. The system can then form a centroid of the response vectors, and can identify a set of responses whose response vectors are closest to the centroid as being prototypical responses.

FIG. 7 presents a flow chart illustrating what happens after a content creator writes a new help center article in accordance with the disclosed embodiments. At the start of this process, the content creator writes the new help center article (step 702). In response, the system adds the new article to the set of existing help center articles (step 704), and embeds a corresponding article vector for the new article in the vector space (step 708). Finally, the system updates the model used to generate the set of request vectors and the set of article vectors based on the new article (step 710).

FIG. 8 presents a flow chart illustrating what happens after a content creator updates an existing help center article in accordance with the disclosed embodiments. At the start of this process, the content creator updates the existing article in the set of existing articles (step 802). In response, the system updates a corresponding article vector for the updated existing article in the vector space (step 804). The system also updates the model used to generate the set of request vectors and the set of article vectors based on the updated existing article (step 806).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for automatically suggesting articles to be written to facilitate resolving customer requests in a customer-support ticketing system, comprising:

obtaining a set of tickets representing customer requests generated by the customer-support ticketing system, wherein each customer request relates to a product or a service used by a customer;

producing a set of request vectors for the set of tickets by feeding words from each ticket in the set of tickets through a model to generate a request vector for the ticket, wherein the request vector comprises numerical values representing words in the ticket;

embedding the set of request vectors in a vector space;

if a set of existing help center articles have already been written for the customer-support ticketing system, embedding a set of article vectors for the set of existing help center articles in the vector space;

performing a clustering operation on the set of request vectors to identify clusters of request vectors, which are within a pre-specified distance of each other in the vector space; and if an identified cluster of request vectors is more than a pre-specified distance away from a closest article vector in the vector space, notifying a content creator that a new article needs to be written or an existing article needs to be updated to cover the identified cluster of request vectors, and when the content creator writes a new article for the help center, the method further comprises:

adding the new article to the set of existing help center articles;

embedding a corresponding article vector for the new article in the vector space, and updating the model used to generate the set of request vectors and the set of article vectors based on the new article.

2. The method of claim 1, wherein when the content creator updates an existing article in the set of existing articles, the method further comprises:

updating a corresponding article vector for the updated existing article in the vector space; and updating the model used to generate the set of request vectors and the set of article vectors based on the updated existing article.

3. The method of claim 1, wherein notifying the content creator that the article needs to be written or the existing article needs to be updated to cover the identified cluster of request vectors includes presenting the content creator with one or more of the following:

a cluster priority score, which indicates an importance of the cluster;

a number of request vectors in the cluster;

a set of keywords from tickets associated with the cluster;

a suggested title for the cluster;

a set of exemplary tickets associated with the cluster;

one or more age metrics for tickets associated with the cluster;

a set of articles having corresponding article vectors that are closest to a center of the cluster; and a set of prototypical customer service agent responses for tickets in the cluster.

4. The method of claim 3, wherein the priority score for a cluster is determined based on a number of tickets associated with the cluster and how recently tickets were received for the cluster.

5. The method of claim 3, wherein the priority score for a cluster is be predicted using a statistical regression model, whereby the priority of the cluster is learnt by tracking user interactions with previously suggested clusters.

6. The method of claim 1, wherein the clustering operation is an online clustering operation, which incrementally adds a new request vector to the vector space when a new ticket is received, and incrementally updates the existing clusters to accommodate the new request vector.

7. The method of claim 6, wherein the online clustering operation includes a decay mechanism that kills a cluster if a ticket has not been received for the cluster within a predefined number of preceding tickets.

8. The method of claim 1, wherein the method further comprises notifying the content creator that an existing article needs to be deleted if a corresponding article vector for the existing article is within a pre-specified distance of another article vector for another existing article in the vector space.

9. The method of claim 1, wherein generating a request vector for a ticket involves:

obtaining a set of words from the ticket;

generating a word vector for each word in the set of words, thereby producing a set of word vectors;

feeding the set of word vectors through a recurrent neural network to produce a preliminary request vector representing the ticket; and feeding the preliminary request vector through a feed-forward neural network to produce the request vector.

10. The method of claim 9, wherein obtaining the set of words from the ticket involves:

combining a subject field and a description field from the ticket into a blob of text;

feeding the blob of text through a regex processor to remove text that does not comprise words to produce a refined blob of text; and selecting the set of words from the refined blob of text.

11. The method of claim 9, wherein generating the word vector for each word in the set of words involves using the Word2vec technique to generate the word vector for each word.

12. The method of claim 9, wherein the recurrent neural network comprises a long short-term memory (LSTM) network.

13. The method of claim 9, wherein the feed-forward neural network modifies the preliminary request vector in a manner that moves request vectors and article vectors for responsive articles closer together.

14. The method of claim 1, wherein each customer request includes a question from a customer about a product or a service used by the customer.

15. A non-transitory computer-readable storage medium storing instructions that when executed by a computer cause the computer to perform a method for automatically suggesting articles to be written to facilitate resolving customer requests in a customer-support ticketing system, the method comprising:

obtaining a set of tickets representing customer requests generated by the customer-support ticketing system, wherein each customer request relates to a product or a service used by a customer;

producing a set of request vectors for the set of tickets by feeding words from each ticket in the set of tickets through a model to generate a request vector for the ticket, wherein the request vector comprises numerical values representing words in the ticket;

embedding the set of request vectors in a vector space;

if a set of existing help center articles have already been written for the customer-support ticketing system, embedding a set of article vectors for the set of existing help center articles in the vector space;

performing a clustering operation on the set of request vectors to identify clusters of request vectors, which are within a pre-specified distance of each other in the vector space; and if an identified cluster of request vectors is more than a pre-specified distance away from a closest article vector in the vector space, notifying a content creator that a new article needs to be written or an existing article needs to be updated to cover the identified cluster of request vectors, wherein notifying the content creator includes presenting the content creator with a cluster priority score, which indicates an importance of the cluster.

16. The non-transitory computer-readable storage medium of claim 15, wherein when the content creator writes a new article for the help center, the method further comprises:

adding the new article to the set of existing help center articles;

embedding a corresponding article vector for the new article in the vector space; and updating the model used to generate the set of request vectors and the set of article vectors based on the new article.

17. The non-transitory computer-readable storage medium of claim 15, wherein when the content creator updates an existing article in the set of existing articles, the method further comprises:

updating a corresponding article vector for the updated existing article in the vector space; and updating the model used to generate the set of request vectors and the set of article vectors based on the updated existing article.

18. The non-transitory computer-readable storage medium of claim 15, wherein notifying the content creator that the article needs to be written or the existing article needs to be updated to cover the identified cluster of request vectors includes presenting the content creator with one or more of the following:

a number of request vectors in the cluster;
a set of keywords from tickets associated with the cluster;
a suggested title for the cluster;
a set of exemplary tickets associated with the cluster;
one or more age metrics for tickets associated with the cluster;
a set of articles having corresponding article vectors that are closest to a center of the cluster; and
a set of prototypical customer service agent responses for tickets in the cluster.

19. The non-transitory computer-readable storage medium of claim 18, wherein the priority score for a cluster is determined based on a number of tickets associated with the cluster and how recently tickets were received for the cluster.

20. The non-transitory computer-readable storage medium of claim 18, wherein the priority score for a cluster is be predicted using a statistical regression model, whereby the priority of the cluster is learnt by tracking user interactions with previously suggested clusters.

21. The non-transitory computer-readable storage medium of claim 15, wherein the clustering operation is an online clustering operation, which incrementally adds a new request vector to the vector space when a new ticket is received, and incrementally updates the existing clusters to accommodate the new request vector.

22. The non-transitory computer-readable storage medium of claim 21, wherein the online clustering operation includes a decay mechanism that kills a cluster if a ticket has not been received for the cluster within a predefined number of preceding tickets.

23. The non-transitory computer-readable storage medium of claim 15, wherein the method further comprises notifying the content creator that an existing article needs to be deleted if a corresponding article vector for the existing article is within a pre-specified distance of another article vector for another existing article in the vector space.

24. The non-transitory computer-readable storage medium of claim 15, wherein generating a request vector for a ticket involves:

obtaining a set of words from the ticket;
generating a word vector for each word in the set of words, thereby producing a set of word vectors;
feeding the set of word vectors through a recurrent neural network to produce a preliminary request vector representing the ticket; and
feeding the preliminary request vector through a feed-forward neural network to produce the request vector.

25. The non-transitory computer-readable storage medium of claim 24, wherein obtaining the set of words from the ticket involves:

combining a subject field and a description field from the ticket into a blob of text;
feeding the blob of text through a regex processor to remove text that does not comprise words to produce a refined blob of text; and
selecting the set of words from the refined blob of text.

26. The non-transitory computer-readable storage medium of claim 24, wherein generating the word vector for each word in the set of words involves using the Word2vec technique to generate the word vector for each word.

27. The non-transitory computer-readable storage medium of claim 24, wherein the recurrent neural network comprises a long short-term memory (LSTM) network.

28. The non-transitory computer-readable storage medium of claim 24, wherein the feed-forward neural network modifies the preliminary request vector in a manner that moves request vectors and article vectors for responsive articles closer together.

29. The non-transitory computer-readable storage medium of claim 15, wherein each customer request includes a question from a customer about a product or a service used by the customer.

30. A system that automatically suggests articles to be written to facilitate resolving customer requests in a customer-support ticketing system, comprising:

at least one processor and at least one associated memory; and
the customer-support ticketing system, which executes on the at least one processor, wherein during operation, the customer-support ticketing system:
obtains a set of tickets representing customer requests generated by the customer-support ticketing system, wherein each customer request relates to a product or a service used by a customer;
produces a set of request vectors for the set of tickets by feeding words from each ticket in the set of tickets through a model to generate a request vector for the ticket, wherein the request vector comprises numerical values representing words in the ticket;
embeds the set of request vectors in a vector space;
if a set of existing help center articles have already been written for the customer-support ticketing system, embeds a set of article vectors for the set of existing help center articles in the vector space;

performs a clustering operation on the set of request vectors to identify clusters of request vectors, which are within a pre-specified distance of each other in the vector space; and if an identified cluster of request vectors is more than a pre-specified distance away from a closest article vector in the vector space, notifies a content creator that a new article needs to be written or an existing article needs to be updated to cover the identified cluster of request vectors, and when the content creator updates an existing article in the set of existing articles, the customer-support ticketing system:

updates a corresponding article vector for the updated existing article in the vector space, and updates the model used to generate the set of request vectors and the set of article vectors based on the updated existing article.

* * * * *